US012235986B2

(12) United States Patent
Piecko

(10) Patent No.: US 12,235,986 B2
(45) Date of Patent: *Feb. 25, 2025

(54) SYSTEMS AND METHODS FOR DETERMINING DATABASE PERMISSIONS

(71) Applicant: DataWalk Spółka Akcyjna, Wroclaw (PL)

(72) Inventor: Krystian Piecko, Herndon, VA (US)

(73) Assignee: DataWalk Spolka Akcyjna, Wroclaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,247

(22) Filed: Dec. 20, 2023

(65) Prior Publication Data

US 2024/0346170 A1 Oct. 17, 2024

Related U.S. Application Data

(63) Continuation of application No. 16/904,852, filed on Jun. 18, 2020, now Pat. No. 11,899,810, which is a continuation of application No. PCT/EP2018/097056, filed on Dec. 28, 2018.

(60) Provisional application No. 62/612,075, filed on Dec. 29, 2017.

(51) Int. Cl.
| G06F 21/62 | (2013.01) |
| G06F 16/10 | (2019.01) |
| G06F 16/20 | (2019.01) |
| G06F 16/23 | (2019.01) |
| G06F 16/245 | (2019.01) |
| G06F 16/2453 | (2019.01) |

(52) U.S. Cl.
CPC .......... *G06F 21/6227* (2013.01); *G06F 16/10* (2019.01); *G06F 16/20* (2019.01); *G06F 16/2379* (2019.01); *G06F 16/245* (2019.01); *G06F 16/24542* (2019.01)

(58) Field of Classification Search
CPC ...... G06F 21/6227; G06F 16/10; G06F 16/20; G06F 16/2379; G06F 16/245; G06F 16/24542; G06F 16/2455; G06F 16/21
USPC .......................................................... 726/28
See application file for complete search history.

(56) References Cited

U.S. PATENT DOCUMENTS

| 2004/0122792 | A1* | 6/2004 | Salazar | G06F 21/6218 |
| 2006/0230043 | A1* | 10/2006 | Sumner-Moore | G06F 21/6218 707/999.009 |
| 2015/0081747 | A1* | 3/2015 | Piecko | G06F 16/22 707/803 |

* cited by examiner

*Primary Examiner* — Hicham Skhoun
(74) *Attorney, Agent, or Firm* — Wilson Sonsini Goodrich & Rosati

(57) ABSTRACT

The present disclosure provides a computer-implemented method for applying access rights to a database comprising a plurality of data units. The method may comprise receiving a request from a user to perform an operation directed to at least a subset of data objects stored in the database. Next, access rights associated with the user may be determined. The access rights may comprise an access permission to a subset of one or more of the data units that is implemented by performing a filter operation. The operation and the filter operation may then be performed concurrently to the at least subset of data objects to obtain a filtered data set.

20 Claims, 11 Drawing Sheets

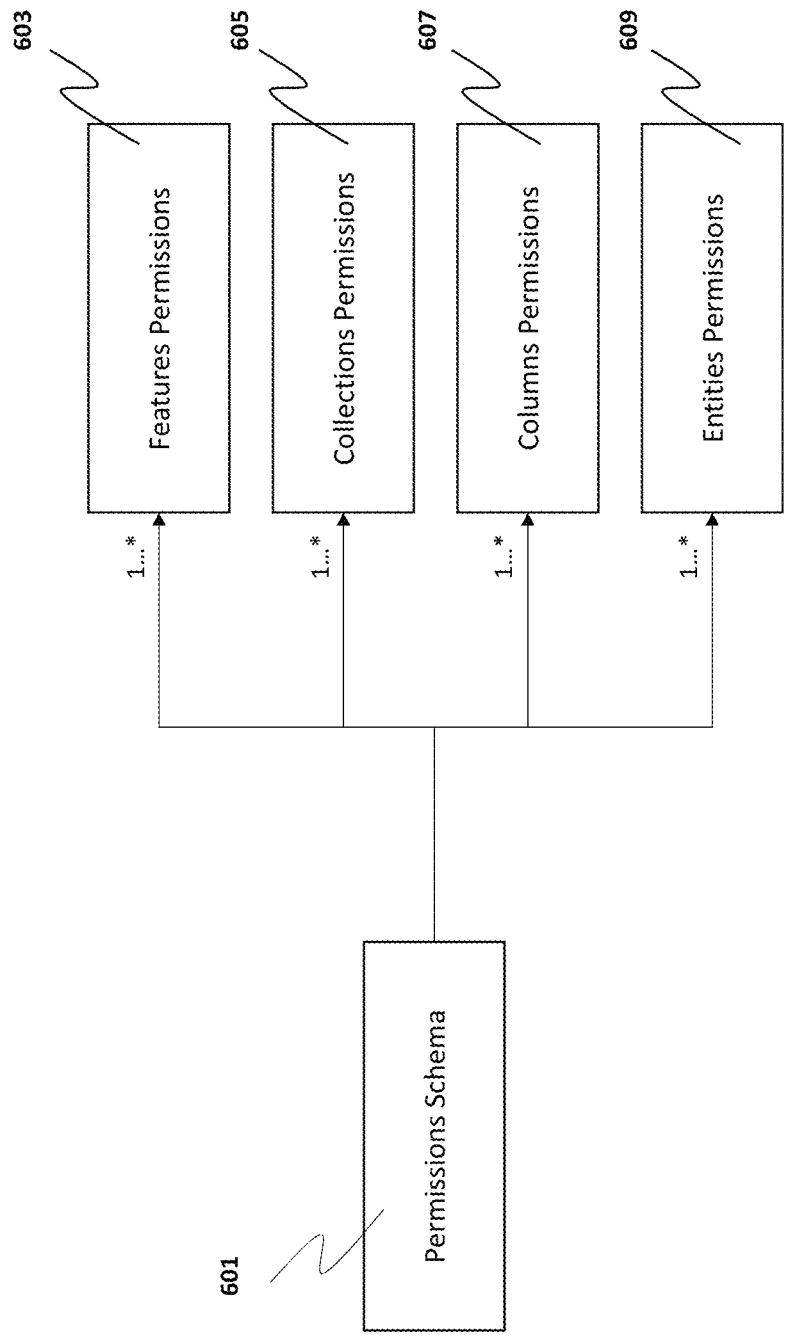

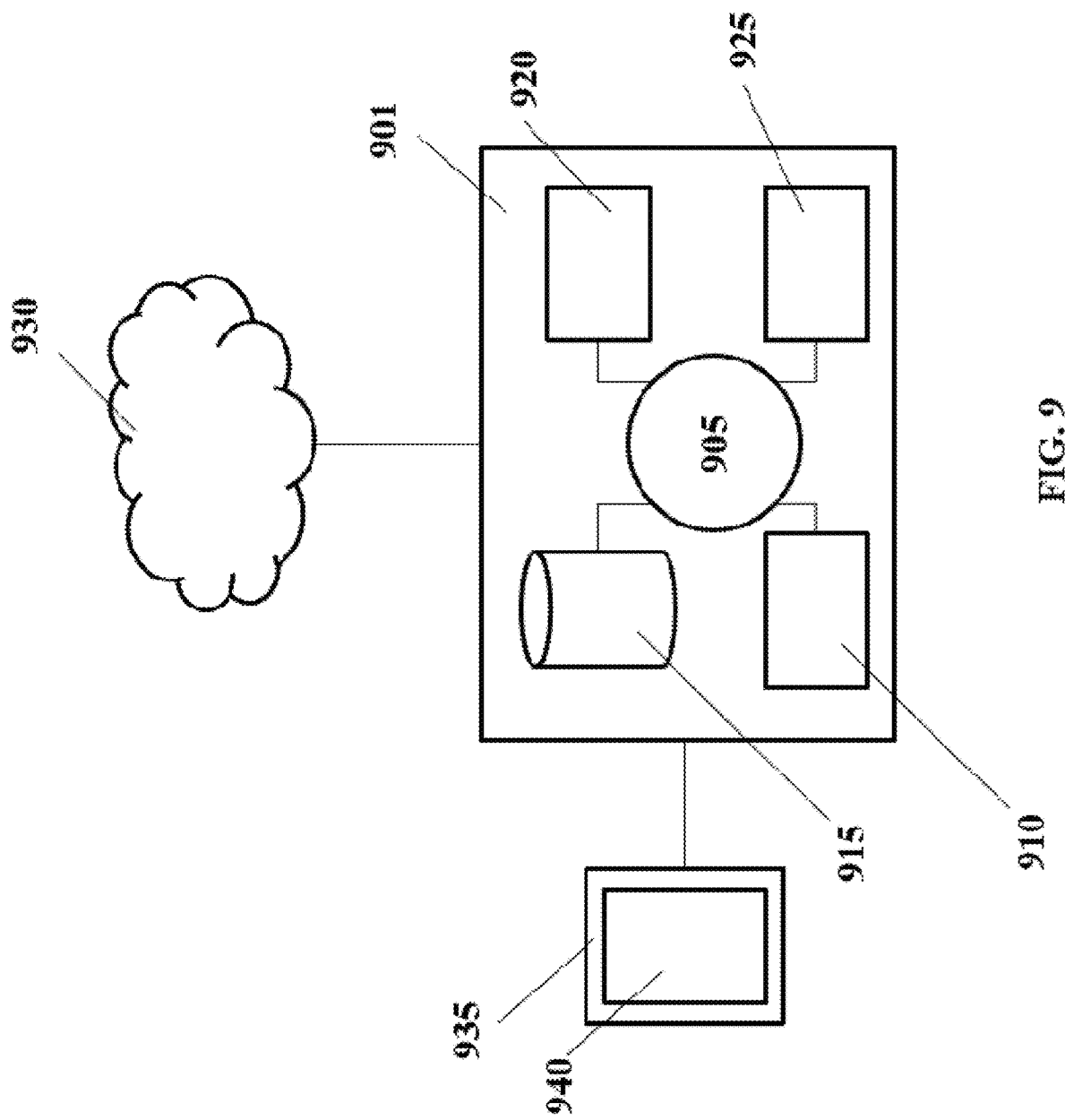

SYSTEMS AND METHODS FOR DETERMINING DATABASE PERMISSIONS

CROSS-REFERENCE

This application is a Continuation Application of U.S. Non-Provisional application Ser. No. 16/904,852, filed Jun. 18, 2020, which is a continuation of International PCT Application No. PCT/EP2018/097056, filed Dec. 28, 2018, which claims the benefit of U.S. Provisional Patent Application No. 62/612,075, filed Dec. 29, 2017, each of which is entirely incorporated herein by reference.

BACKGROUND

A database is a data storage concept that has evolved for decades since the 1960s to address increasing difficulties in designing, building, and maintaining complex information systems (e.g., multi-user systems with a large amount of data). Another data storage concept directly related to the database is a database management system (DBMS), which enables the effective handling of databases. Although the terms, database and DBMS, define different entities, they may be inseparable; for example, the properties of a database may be determined by a supporting DBMS of the database. A DBMS may be a complex software system, such as a general-purpose DBMS (e.g., Oracle®, Microsoft® Structured Query Language (SQL) Server®).

In particular, three major DBMS approaches that are widely used in the industry to create and manage a database are relational databases, object databases, and graph databases.

A relational database can be a collection of data items organized as a set of formally described tables from which data can be accessed easily. A relational database may be created using the relational model. The software used in a relational database may be referred to as a relational database management system (RDBMS). An RDBMS may comprise a number of tables in which, for example, each table has its own primary key.

A problem with the relational database may be the complexity that arises when the relational database is created. It is generally important that defined relationships among the tables are correct and that each set of information is linked to its pair. Although less information has to be entered in total than with other database approaches, verifying that the points are set up correctly may be a time-consuming process. Furthermore, the relationships between the tables can become complicated when a relational database comprises numerous tables.

An object database (also referred to as object-oriented database management system or OODBMS) can be a database management system comprising information represented in the form of objects, such as the objects used in object-oriented programming. Object databases may be different from relational databases. In some instances, a broader database management system may comprise both object databases and relational databases.

An object database may store complex data and relationships between data directly, for example, without mapping to relational rows and columns, which may make object databases suitable for applications in which complex data may be encountered. Objects may have a many-to-many relationship and may be accessed by the use of pointers. Pointers may be linked to objects to establish relationships. Another benefit of an OODBMS may be that an OODBMS may be programmed with small procedural differences without affecting the entire system. This may be helpful for those organizations that use data relationships that are not entirely final or where there is a need to change these relationships to satisfy a new business requirement.

Disadvantages of object databases may include, for example, lower efficiency when data is complex and/or relationships are complex, that late binding may slow down access speed, data and operations being separated, low responsiveness to changes in problem space, and inadequate design for concurrent problems.

A hybrid object-relational database may be suitable for some applications. A client application may direct queries to an object server component to obtain data from data sources. An object server component may operate with an object definition component which may fulfill the queries. An object definition component may access an object definition database to obtain and use metadata, in the form of programmatic objects, about the location and structure of the data stored in the data sources. In some cases, an object manager component may, for example, work with the object definition component to edit and create new metadata or, via the object server component, create new instances of the data sources.

Graph databases may depart from traditional storage and definitions paradigms. Many software developers may be familiar with storing data in tabular form in a relational database. Such approaches may work well for some applications, but not for others. Relational databases, for example, may exhibit difficulties in scaling. Given that more and more of today's innovative applications may involve massive data processing, such large data processing requirements may expose a need for new approaches, such as graph databases. For example, tables (e.g., tables used in relational databases) may be difficult to implement in web-based environments. Since a web may be characterized more as a collection of pages that are hyperlinked, than identically-shaped rows in a gigantic table, a graph database may more closely align with present-day web architectures. In some cases, a graph, as known from mathematics, or as informally drawn or used by most engineers, may be a much more natural representation for data that is native to the web. Given that much of the data processed by today's innovative applications may exist elsewhere or in remote locations, and given that some applications may not own a substantial percentage of their own data, such as for some social feed aggregators, graph databases may be more suited than some other database models.

Current databases, such as ORACLE®, may provide for the use of an ALTER command. The process of modifying database structures may directly require locking a database structure that will be modified. There is also a related LOCK command that effectuates a freeze of a database structure for the time of modification, such as adding, searching for, or modifying records of a given table. Some end-user database systems may make use of special scripts utilizing special triggers that may execute ALTER and/or LOCK commands automatically.

In some instances, an operation of adding a column to a database may lock a table. Further, an ALTER command may stop currently executing data processing tasks, such as transactions. This may render processing operations executing with varying number of parameters ineffective, and may potentially threaten the integrity of data gathering. Further, if data are collected very quickly, the size of a data buffer may be insufficient.

The use of the aforementioned commands in databases that are updated frequently may be problematic because such approaches may require the databases to stop certain services during each modification process. It may be beneficial to create a database system that does not require the stopping of one or more services when, for example, a new column is to be added to an existing table.

Drawbacks of known graph databases may include, for example, increased memory requirements and difficulties in presenting information to a user in a clear way. In some cases, where a few nodes have a large number of connections and most other nodes have fewer connections, graph databases may be designed to keep the nodes and their linked objects (references) as close as possible (e.g., in proximity); as a result, the graph databases may not be split, leading to inefficient data drilling. Further drawbacks of current database systems include the unavailability of extending databases in real time and difficulties in understanding how a complex database is designed.

At least for the disadvantages and fallbacks of the present techniques that have been described, there is a need to design and implement an efficient database model that is especially adapted to large scale databases, is easily scalable, and has reduced memory requirements in comparison to graph, relational or object-oriented databases.

Moreover, as a database increases in scale, the different permissions (e.g., user permissions) associated with different aspects of the database may become more complicated. For example, the size of the information (e.g., data, metadata) relating to the permissions may even exceed that of the substantive data protected by such permissions.

SUMMARY

Recognized herein are various limitations to databases and data analysis methods that are currently available, such as those described above. It may be advantageous to improve data access to databases with a flexible data permission schema. Beneficially, the permission schema of the present disclosure may be independent of group-based permission definitions. For example, up to now, group-based permission systems grouped different data units (e.g., data objects, etc.) into a first set of groups, and different users into a second set of groups, and determined access of a data unit by a user by processing and comparing the first set of groups and the second set of groups associated with the data unit and the user, respectively. However, such processing can be extremely inefficient for large scale data units, where permutations for different groups increase exponentially and information relating to the permissions (e.g., group definitions) can eventually exceed the substantive data which is protected by the same permissions. Group-based definitions may substantially slow down readouts because they may necessitate validating every request (for data access) against whether a data unit is in one or more particular groups that grant certain access rights to the user. Assigning bulk data units to a group may further slow down the process. Furthermore, a traditional SQL-based system may not be able to disambiguate multi-group assignment for users, that is, allowing only one group assignment per user, which substantially decreases flexibility in assigning different permission to different users.

Provided herein are systems and methods for flexible data permission schemas. A permission schema may comprise one or more permission definitions. A permission definition may define access rights to any level of data unit, such as a data set (or collection or class), data object (or entry or entity), data attribute (or column), and other units of data. For example, an access right may be a mode of access, such as 'read' or 'read/write' access. In other examples, an access right may comprise operations such as 'add' or 'delete' (of an object) from a data unit (e.g., class or collection). A user may be assigned a permission schema. A user may be assigned a plurality of permission schemas, wherein the plurality of permission schemas is ordered in an order of priority. A permission schema of a higher order (e.g., last applied) may override a conflict with another permission schema of a lower order (e.g., earlier applied). The plurality of permission schemas assigned to a user may be consolidated based on the order of priority. A plurality of users may be assigned to the same permission schema. A first permission schema may contain, overlap with, and/or partially overlap with, the permissions of a second permission schema.

Methods and systems of the present disclosure may allow a user to explore, mine, and/or analyze data objects by building search paths or creating analyses. An analysis may correspond to a search path. An analysis may comprise multiple queries or operations. Methods and systems of the present disclosure may automatically filter the data objects available to (e.g., retrieved by) the user based on the one or more permission schemas assigned to the user. The permission schema(s) may be applied at the time a query, such as a query forming a search path or analysis, is executed. The permission schema(s) may be applied at any time a user performs an action (e.g., modify, create, remove, etc.) on a data unit.

Systems of the present disclosure may be connection-oriented. An underlying relational database management system (RDBMS) may be optimized around connections (as opposed to objects). For example, when the RDBMS partitions data for performance, there is no need for an object to reside wholly within a single partition. In the disclosed system, the connections may be spread across all available compute resources. Consequently, even massively linked objects may be handled without the performance penalty issues in a traditional graph database.

In an aspect, provided is a computer-implemented method for applying access rights to a database, comprising: receiving a request from a user to perform an operation directed to at least a subset of data objects stored in the database, wherein the database comprises a plurality of data units; determining access rights associated with the user, wherein the access rights comprise an access permission to a subset of the plurality of data units that is implemented by performing a filter operation; and performing the operation and the filter operation concurrently to the at least the subset of data objects to obtain a filtered data set.

In some embodiments, the access rights are determined based on one or more permission schemas assigned to the user. In some embodiments, the access rights are determined by merging the one or more permission schemas associated with the user according to a logic rule. In some embodiments, at least one of the one or more permission schemas comprise permission definitions for different data units. In some embodiments, the permission definitions for different data units are different. In some embodiments, each of the one or more permission schemas is identified by a name or an identifier. In some embodiments, the permission definitions for different data units are stored in different data structures.

In some embodiments, the data units comprise a class, a data object, and attribute of a class.

In some embodiments, the access right is a mode of access. In some embodiments, the mode of access is a read access. In some embodiments, the mode of access is a read/write access. In some embodiments, the mode of access is a modify access. In some embodiments, the mode of access is an execute access.

In some embodiments, the access permission comprises a permission to perform the operation.

In some embodiments, the operation is an add operation or delete operation.

In some embodiments, the operation is part of a search query.

In some embodiments, the data objects are stored in the database in a non-hierarchical manner, wherein the database is a relational database.

In some embodiments, the database comprises one or more data structures selected from the group consisting of: a first data structure, stored in a memory, comprising a definition of data sets in the relational database, wherein a definition of a data set comprises a unique data set identifier and a set name; a second data structure, stored in the memory, comprising definitions of properties of objects in the relational database, wherein a definition of a property comprises a unique identifier of the property and a data set identifier, from the first data structure, the property is assigned to; a third data structure, stored in the memory, comprising definitions of objects of the data sets in the relational database, wherein a definition of an object comprises a unique object identifier and a data set identifier, from the first data structure, the object is assigned to; a fourth data structure, stored in the memory, comprising definitions of object values of the data sets in the relational database, wherein a definition of object value comprises an object identifier, from the third data structure, and a property of the data set, from the second data structure, the object value being assigned to; a fifth data structure, stored in the memory, comprising definitions of relations of data sets in the relational database, wherein a definition of a relation comprises a unique identifier of the relation and a name of the relation; a sixth data structure, stored in the memory, comprising definitions of objects relations between the objects in the relational database, wherein a definition of an object relation associates a relation, from the fifth data structure, with two object identifiers from the third data structure; and a seventh data structure, stored in the memory, comprising definitions of set relations between data sets in the relational database, wherein a definition of a set relation associates a relation, form the fifth data structure, with two set identifiers from the first data structure.

In another aspect, provided is a system for applying access rights to a database comprising: one or more computer processors operatively coupled to the relational database, wherein the one or more computer processors are individually or collectively programmed to: receive a request from a user to perform an operation directed to at least a subset of data objects stored in the database, wherein the database comprises a plurality of data units; determine access rights associated with the user, wherein the access rights comprise an access permission to a subset of the plurality of data units that is implemented by performing a filter operation; and perform the operation and the filter operation concurrently to the at least the subset of data objects to obtain a filtered data set.

In some embodiments, the access rights are determined based on one or more permission schemas assigned to the user. In some embodiments, the access rights are determined by merging the one or more permission schemas associated with the user according to a logic rule. In some embodiments, at least one of the one or more permission schemas comprise permission definitions for different data units. In some embodiments, the permission definitions for different data units are different. In some embodiments, each of the one or more permission schemas is identified by a name or an identifier. In some embodiments, the permission definitions for different data units are stored in different data structures.

In some embodiments, the data units comprise a class, a data object, and attribute of a class.

In some embodiments, the access right is a mode of access. In some embodiments, the mode of access is a read access. In some embodiments, the mode of access is a read/write access. In some embodiments, the mode of access is a modify access. In some embodiments, the mode of access is an execute access.

In some embodiments, the access permission comprises a permission to perform the operation.

In some embodiments, the operation is an add operation or delete operation.

In some embodiments, the operation is part of a search query.

In some embodiments, the system further comprises a relational database, wherein the data objects are stored in the database in a non-hierarchical manner.

In some embodiments, the database comprises one or more data structures selected from the group consisting of: a first data structure, stored in a memory, comprising a definition of data sets in the relational database, wherein a definition of a data set comprises a unique data set identifier and a set name; a second data structure, stored in the memory, comprising definitions of properties of objects in the relational database, wherein a definition of a property comprises a unique identifier of the property and a data set identifier, from the first data structure, the property is assigned to; a third data structure, stored in the memory, comprising definitions of objects of the data sets in the relational database, wherein a definition of an object comprises a unique object identifier and a data set identifier, from the first data structure, the object is assigned to; a fourth data structure, stored in the memory, comprising definitions of object values of the data sets in the relational database, wherein a definition of object value comprises an object identifier, from the third data structure, and a property of the data set, from the second data structure, the object value being assigned to; a fifth data structure, stored in the memory, comprising definitions of relations of data sets in the relational database, wherein a definition of a relation comprises a unique identifier of the relation and a name of the relation; a sixth data structure, stored in the memory, comprising definitions of objects relations between the objects in the relational database, wherein a definition of an object relation associates a relation, from the fifth data structure, with two object identifiers from the third data structure; and a seventh data structure, stored in the memory, comprising definitions of set relations between data sets in the relational database, wherein a definition of a set relation associates a relation, form the fifth data structure, with two set identifiers from the first data structure.

Another aspect of the present disclosure provides a non-transitory computer-readable medium comprising machine-executable code that, upon execution by one or more computer processors, implements any of the methods described above or elsewhere herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods described above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein).

FIGS. 6A-B show an example permission schema comprising permission definitions.

FIG. 9 shows a computer system that is programmed or otherwise configured to combine and score multiple analyses.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods for flexible management of user data access. A user may be assigned one or more permission schemas, each comprising one or more permission definitions. A permission definition may define a user's access rights (e.g., read, read/write, etc.) to a particular type or level of data (e.g., data object, data class, data attribute, etc.). When a user is assigned more than one permission schema, the multiple permission schemas may be merged and/or consolidated by an order of priority between the permission schemas to override conflicts, if any.

Methods and systems of the present disclosure may control user access to different data units in one or more databases, such as when a user explores, mines, and/or analyzes data objects by building search paths or creating analyses or when a user adds or removes data objects from an existing database. The permission schema(s) may be applied at the time a query, such as a query forming a search path or analysis, is executed. A user may or may not be made aware of the permission schema(s) applied during the query. For example, one or more permission schemas (a) may be applied automatically in the form of performing a filtering operation to a result data set of a query.

Permission Schemas

Figure 1:
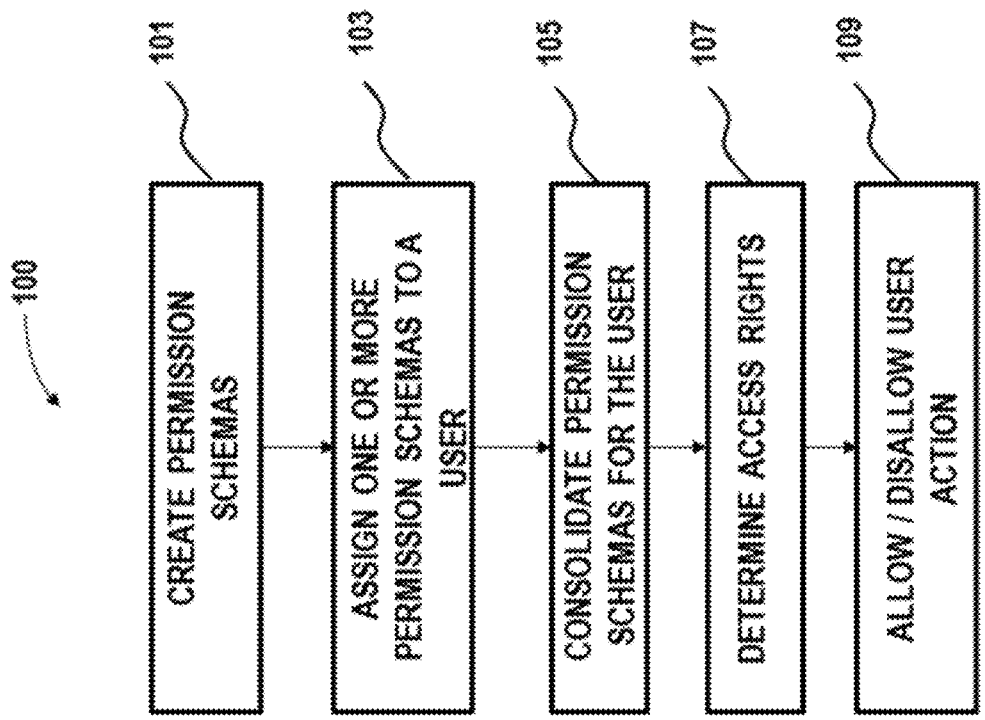
FIG. 1 schematically shows an exemplary process of applying a permission schema to a user action.

FIG. 1 schematically shows an exemplary process 100 of applying a permission schema to a user action. In a first operation 101, one or more permission schemas may be created. A permission schema may be created by a user. Alternatively, a permission schema may be preprogrammed. For example, a preprogrammed permission schema may have default permission definitions. Alternatively, a preprogrammed permission schema may be modified or adopted by a user. In some cases, a preprogrammed permission schema may be overridden by user input. Alternatively, a preprogrammed permission schema may not be overridden by user input. Alternatively or additionally, parts (e.g., one or more permission definitions) of a programmed permission schema may be overridden and other parts may not be.

A permission schema may be identified by a name or an identifier. The name or identifier may be unique. A permission schema may define one or more permission definitions. A permission definition may associate a user access right to a type or level of data unit. For example, the type or level of data unit may be a data class (or set or collection), data attribute (or column) or value, data object (or entity), a system feature or other data unit. Details regarding the data structures and data units adopted by the provided system are described with respect to FIGS. 2-5.

The access right may comprise a plurality of rules and/or types of access to the data unit. For example, the user access right may be an access mode, such as a "read" mode or "write" mode or other modes (e.g., "modify," "execute," etc.). The access mode may be specific to the type or level of data unit. For example, a permission definition which associates a "read" access to a data set (i.e., collection or class) may allow the user to view the data class (e.g., identifiers thereof), but not the data objects or the data attributes. In another example, a permission definition which associates a "read" access to a data attribute may allow the user to view the data attribute (e.g., identifiers thereof) but not the data objects. The permission schema may comprise a feature definition for a system feature. In some instances, the feature definition may be binary (e.g., 0/1, on/off, true/false, etc.). For example, the feature definition may be one of "On" or "Off." The feature definition may comprise a feature for enabling/disabling (e.g., on/off) a system function. For example, a feature definition may include allowing/denying a user to use data uploads or execute search paths.

An access right may be referred to as "permission" or "permission right" throughout the specification. An access right or permission for a data object may comprise one or more rules. In some cases, a rule may comprise a predicate. In some cases, a predicate may be an operation allowing a user to change or modify data units stored in the system. For instance, a predicate operated over classes may be 'add' or 'delete' allowing a user to add or remove an object from a class. In some cases, a predicate may be a filter operation performed in conjunction with queries such that the result data objects are provided to a user as conformed to the permission rule. The filter operation may be generated based on the rule such that the result data set may only comprise data objects that the user is permitted to access. For example, the filter operation associated with the access right may be executed concurrently with a user query. In some instances, the rule may be provided as one or more simple statements (e.g., "Name!='Ahmed'"; "amount>5000"; etc.) comprising parameters that may or may not be satisfied based on the parameters of the user action, such as a search step. In some instances, the permission or rule may be performed automatically during a query without user interference. For example, the permission or rule may be performed concurrently with a user action. Alternatively or additionally, the permission or rule may be performed prior to or subsequent to the user action. It may be advantageous to improve system performance by applying permission rules at runtime, particularly incorporating the permissions or access rights into the data structures for storing the data objects in the system.

A permission definition for a data unit may comprise a list of one or more elements of the data unit. Permission definitions associated with different types or levels of data units may or may not be the same. For example, the permission definition for collection or class may have four access rights (e.g., read, write, add, delete) whereas the permission definition for entity or object may have two access rights (e.g., read, write). The access right associated with the level of data unit may apply to the list of the one or more elements defined in the permission definition. A first permission schema may contain, overlap with, and/or partially overlap with, the permission definitions of a second permission schema.

In some instances, a permission schema may comprise a permission definition for one or more types or levels of data unit. For example, for a database comprising four levels of data units, a permission schema may comprise four permission definitions for the four levels of data units. Alternatively, the permission schema may have more or fewer permission definitions than types or levels of data units. In some cases, where an access right to a particular level or type of data unit is undefined in a permission schema, the system may have a preprogrammed default access right for that level or type of data unit. For example, the default access right may be global access or global denial of "read" or "write, and the like.

Figure 6B:
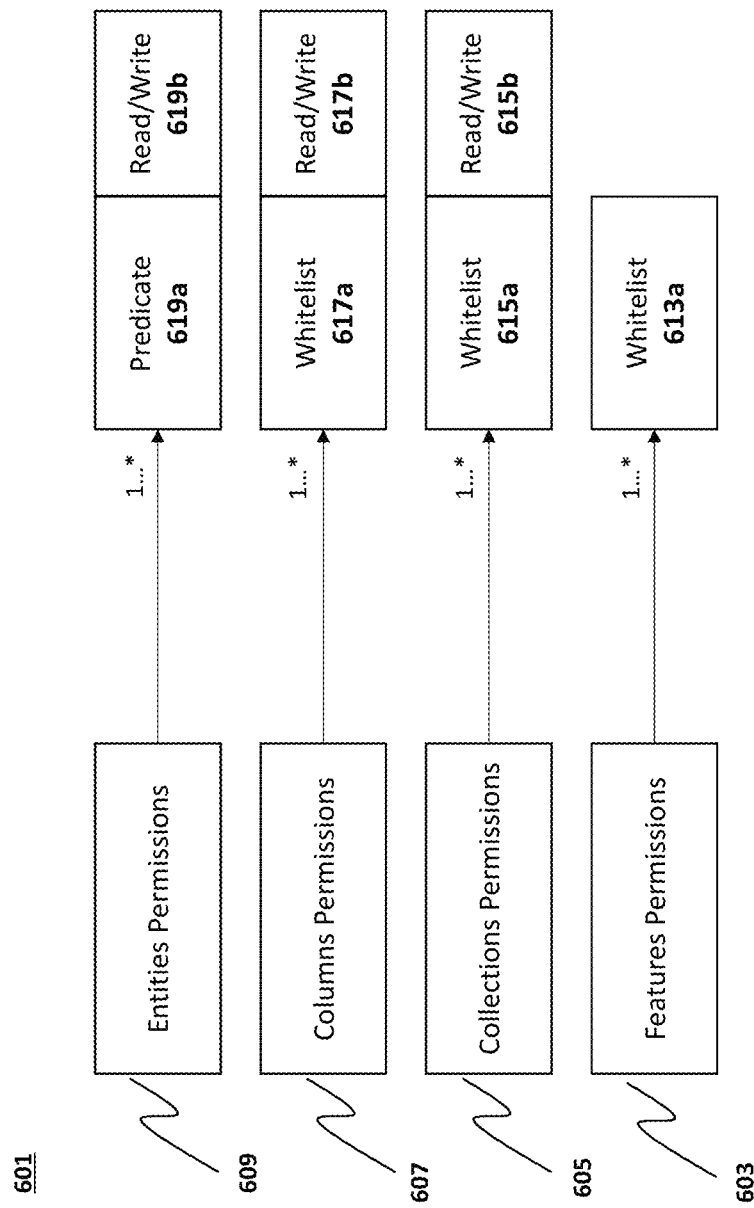

FIGS. 6A-B show an example of a permission schema comprising permission definitions. In the example, the permission schema 601 comprises a feature definition for features 603, and a permission definition for each of a data class 605, data attributes 607, and data objects 609. The permission definition for data objects 609 may comprises a list of rules or predicates 619*a* and an access right 619*b* (e.g., read or write). The permission definition for data attributes 607 comprises a list of data attribute elements 617*a* and an access right 617*b*. The list of data attribute elements may comprise at least some of the attributes or columns of a class. The permission definition for data class 605 comprises a list of data class elements 615*a* and an access right 615*b*. The features definition for features 603 comprises a list of feature elements 613*a*. The features definition may comprise one of a binary definition, such as "on" or "off."

The definitions for the permission schemas created may be stored in the database system. The definitions for the permission schemas created may be organized and stored using a set of logical data structures, as described elsewhere herein. For instance, permissions associated with a collection or class may be stored in a designated table (e.g., EntityClassAccess table), permissions associated with attributes may be stored in another table (e.g., AttributeAccess table), permissions associated with entities may be stored in a designated table (e.g., Entity Access table), and permissions associated with features may be stored in a table (e.g., FeaturesAccess table or System_configuration table). Such data structures (e.g., tables) may be referenced by other predefined data structures as described later herein. For example, the tables for storing the access rights to columns/attributes may include userID, attributes ID (e.g., whitelist 617*a*) and access rights (e.g., read/write 617*b*), wherein the entity class ID and userID can be used by other entities for referencing the access rights. In some cases, the entity class attributes may comprise an attribute configured for applying the permission rules. For instance, the attribute may have a value that may be filtered on as defined by the permission rule.

In some cases, prior to executing a store operation, the operation of calculating single final access rights per user may be executed. This operation may combine multiple rules into single set of rules, which may have similar structure as a permission schema. This operation may comprise 'consolidating' or 'flattening' operation as described later herein. This structure may be mapped to EntityClassAccess table entry, AttributeAccess table entry and Entity Access table entry. It is advantageous to speed up the execution process especially for large data, by operating only one set of access rules for a request submitted by a user.

Figure 7A:
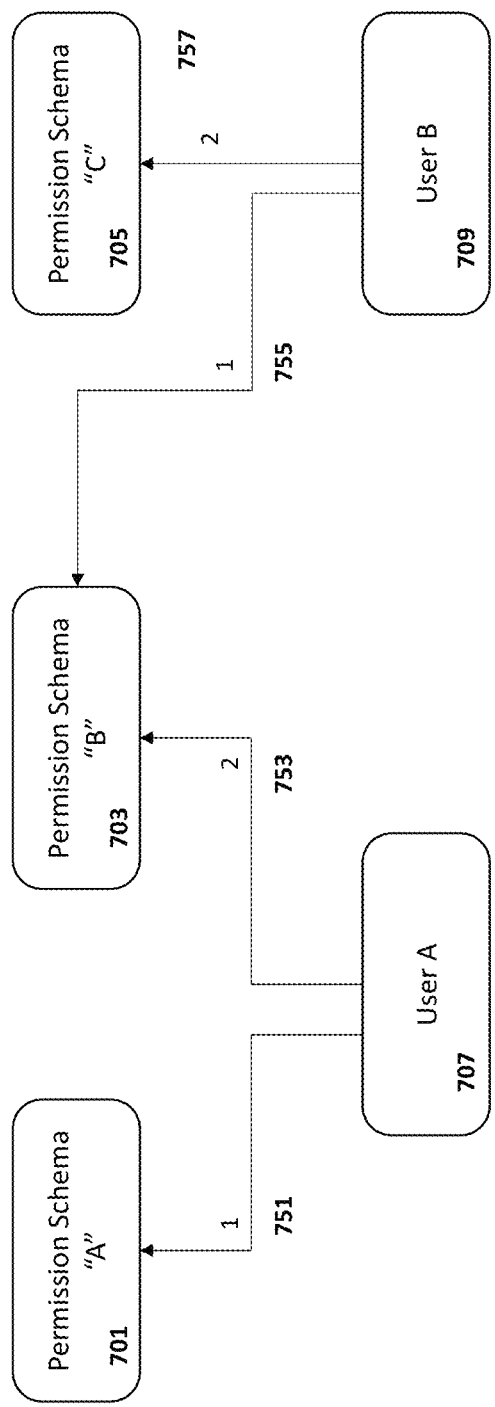
FIGS. 7A-7B show example assignments of permission schemas to users.
Figure 7B:
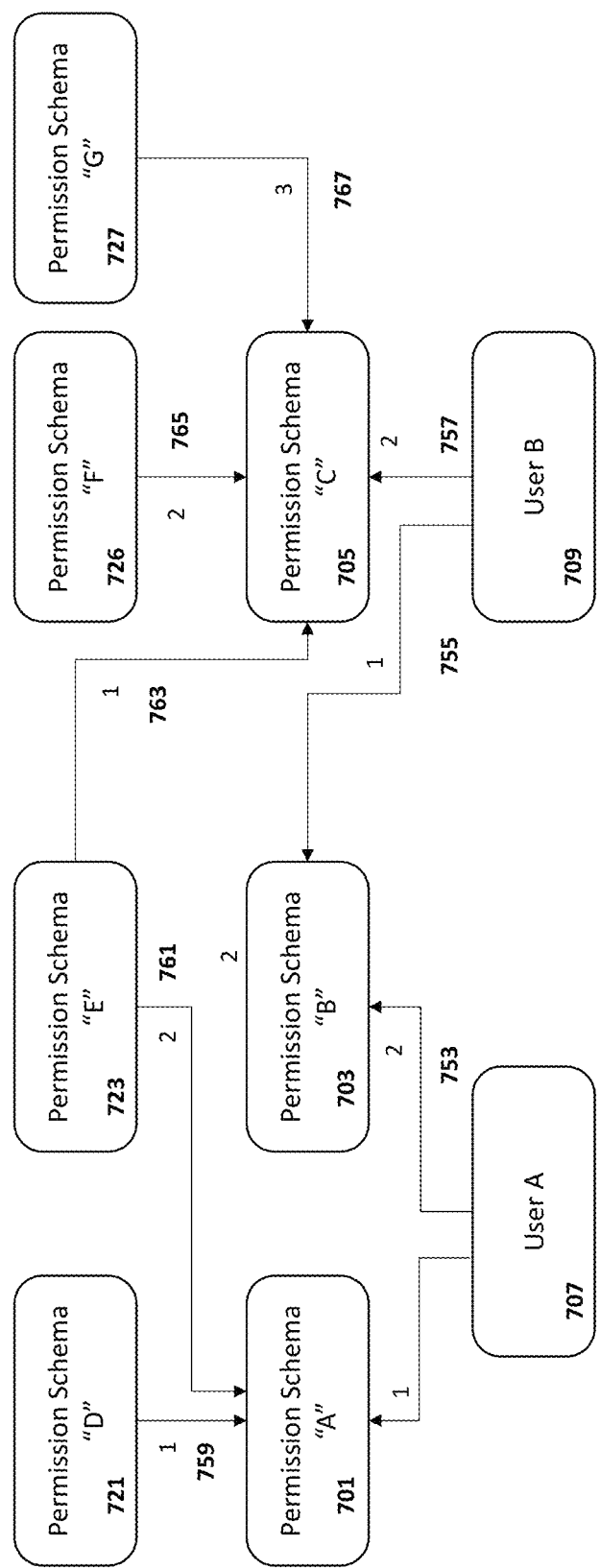

Referring to process 100, once the permission schema(s) are created, one or more selected permission schemas can be assigned to a user 102. A user may be assigned to one or more permission schemas. Alternatively, a user may not be assigned to a permission schema. In some instances, one or more permission schemas may be automatically assigned to any user by default, which may or may not be overridden by manual assignment (or removal of a pre-assigned permission schema). A permission schema may be assigned to one or more users. Alternatively, a permission schema may not be assigned to any user. FIGS. 7A-7B show example assignments of permission schemas to users. For example, as shown in FIG. 7A, a permission schema A 701 and a permission schema B 703 may be assigned to user A 707, and the permission schema B 703 and a permission schema C 705 may be assigned to user B 709. In some cases, assigning a permission schema may comprise storing or updating a value in the data structures (e.g., EntityClassAccess table).

When a user is assigned to more than one permission schema, the assigned permission schemas may be ordered by priority, such as in order of assignment. In some instances, when there is a conflict in permission definitions and/or rules or predicates between a plurality of permission schemas assigned to a user, the conflict may be resolved by order of priority of the plurality of permission schemas. For example, a conflicting permission definition in a permission schema of a higher order may trump a conflicting permission definition in a permission schema of a lower order. The order of priority may be determined by order of assignment (e.g., a later assigned permission schema may have a higher order than an earlier assigned permission schema, or vice versa). Alternatively or in addition, the order of priority may be manually assigned to each permission schema. For example, as shown in FIG. 7A, for user A 707, the permission schema A 701 has a priority of 1 (751) and the permission schema B 703 has a priority of 2 (753), and for user B 709, the permission schema B 703 has a priority of 1 (755) and the permission schema C 705 has a priority of 2 (757). In an example, a higher number of priority may trump a lower number of priority (e.g., permission schema B trumps permission schema A for user A).

Referring to process 100, the multiple permission schemas for the user may be consolidated 105, such as by the order of priority described in the previous example. In some instances, a permission schema may comprise other permission schemas. For example, a first permission schema may be an aggregate of a second and third permission schema. When aggregating multiple permission schemas into a single permission schema, similar to consolidating permission schemas for a user, the multiple permission schemas may be consolidated by an order of priority. When a user is assigned to multiple (primary) permission schemas, some of which aggregate other (secondary) permission schemas, the other (secondary) permission schemas may be consolidated into (primary) permission schemas first before the multiple (primary) permission schemas may be consolidated for a user. Similarly, if a (secondary) permission schema aggregates other (tertiary) permission schemas, the other (tertiary) permission schemas may be consolidated into the (secondary) schema before the (secondary) schemas are consolidated into a (primary) permission schema. A permission schema may be endlessly aggregating any number or levels (e.g., primary, secondary, tertiary, quarternary, etc.) of permission schemas. For any consolidation of multiple permission schemas, in some instances, rules or predicates defining permissions for data objects may be combined using any specific operation, such as OR or AND, as appropriate.

In some cases, the multiple permission schemas for the user may be consolidated to generate a permission outcome. The permission outcome may be a 'flattened' permission schema that has resolved all conflicts (if any) between different permission schemas (e.g., primary, secondary, tertiary, etc.) assigned to or otherwise associated to a user. For example, as shown in FIG. 7B, the permission schema A 701 of FIG. 7A aggregates a permission schema D 721 and a permission schema E 723 with order of priority 1 (759) and 2 (761), respectively. The permission schema C 705 aggregates the permission schema E 723, a permission schema F 725, and a permission schema G 727 with order of priority 1 (763), 2 (765), and 3 (767), respectively. In the example, a first consolidation operation may consolidate permission schema D and permission schema E to permission schema A, and a second consolidation operation may consolidate consolidated permission schema A and permission schema B to generate a first 'flattened' permission outcome for user A that has resolved all conflicts (if any) between permission schemas A, B, D, and E. In another example, a first consolidation operation may consolidate permission schema E, permission schema F, and permission schema G to permission schema C, and a second consolidation operation may consolidate permission schema B and consolidated permission schema C to generate a second 'flattened' permission outcome for user B that has resolved all conflicts (if any) between permission schemas B, C, E, F, and G.

Referring to process 100, access rights for the user may be determined 107 from the flattened permission outcome. The determined access rights may be used to allow or disallow a user action 109. In some instances, the access rights may be applied to filter one or more data units during a user search or analysis, such as when a user explores, mines, and/or analyzes data objects by building search paths or creating analyses. The access rights may allow or disallow a user from adding, modifying, or removing data objects or other data units in the database. The access rights may be applied to any type of user action. The access rights may be applied at the time of action, such as at the time a query, such as a query forming a search path or analysis, is executed. A user may or may not be made aware of the permission schema(s) applied during the query.

Figure 8:
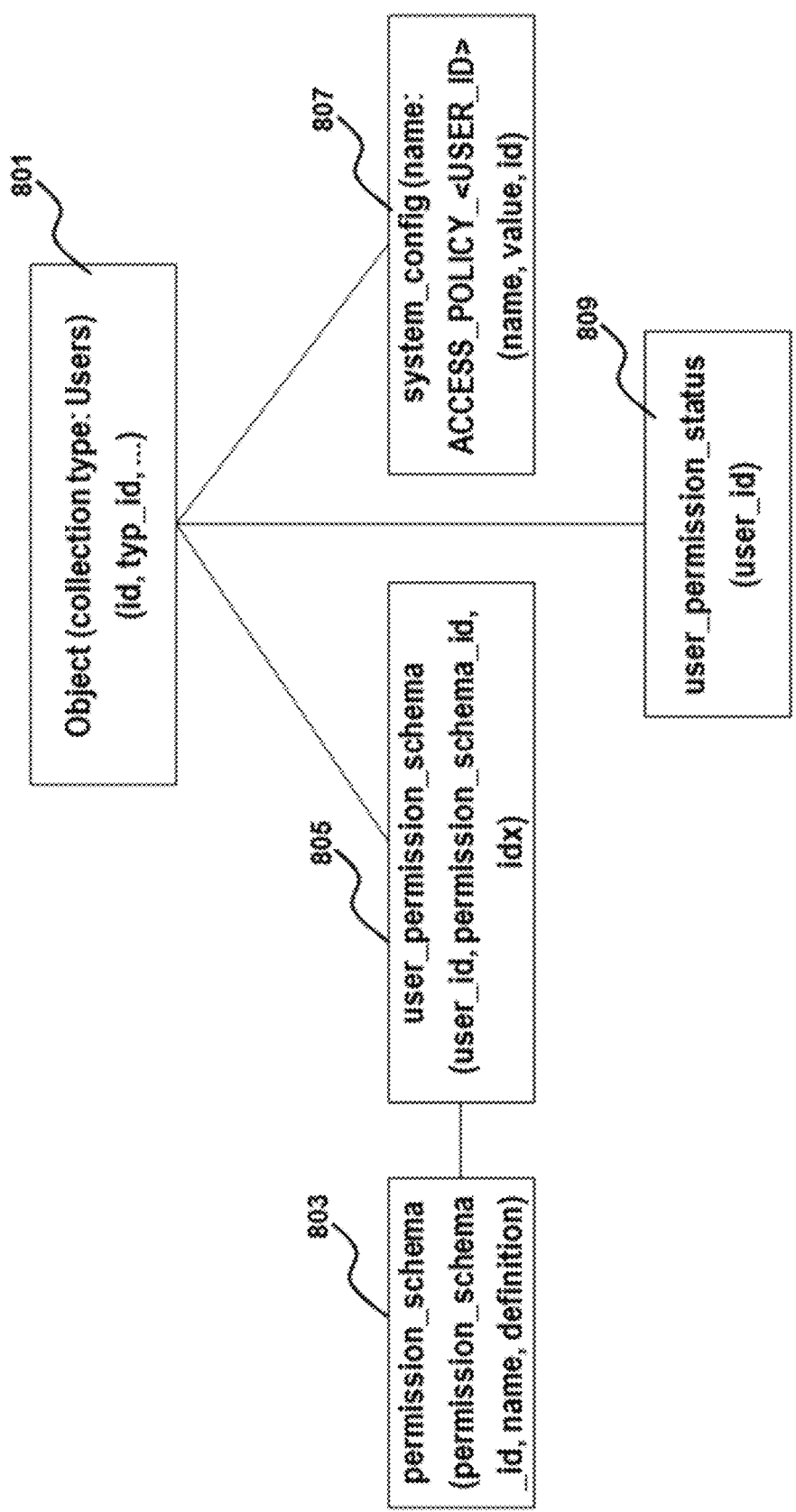
FIG. 8 illustrates an example of storing permission schemas.

FIG. 8 illustrates an example of storing permission schemas. Persons of skill in the art can appreciate that permission schemas may be implemented using various different data structures and architectures. As mentioned above, the permission schemas may comprise permission definitions associated with different types of data units stored in a set of data structures. In the illustrated example, the permission schemas may be stored in a data structure 803 (e.g., permission_schema table) comprising a permission schema identifier (e.g., permission_schema_id), name of a permission schema, and definition. An entry of the permission schema definition may comprise, for example, name of the data unit (e.g., column, entity class, entities, features), and access mode (e.g., read/write) or permission rule (e.g., add/delete). An assignment of permission schema to a user may be stored in a data structure 805 (e.g., user_permission_schema table) which is configured to associate a permission schema with a user. For instance, an entry of the table may comprise a user identifier (e.g, user_id), permission schema identifier (e.g., permission_schema_id) referenced from the permission schema table 803, and an assignment or user permission scheme identifier (e.g., idx). The data structure 805 may be used for retrieving a sequence of permissions assigned to a user. The user identifier may be referenced from a 'user' data set 801. The 'user' data set 801 may be a collection of objects with type as "Users." In some cases, a data structure 807 (e.g., system_config table) may be utilized to store feature permission schema and/or entity permission schema. The data structure 807 may also be used to store the calculated permission result (e.g., permission outcome consolidating one or more permission schemas assigned to the user) for a user. In some cases, a data structure 809 (e.g., user_permission_status) may be used to store status of a permission for a user. The status may indicate whether the current permission is still valid. In some cases, permission for a user may be recalculated or updated when the status indicates the permission is outdated or invalid. The status may be used for triggering calculation of the permission or access rights for a user.

As described elsewhere herein, objects in the database may be organized and stored using a set of logical data structures. Such set of logical data structures may be based on a mind map. Storing objects in a database based on the mind map architecture allows a user to explore objects, and perform analysis by creating, modifying and storing one or more search paths with improved efficiency and flexibility.

Database Systems

A relational database of the present disclosure may be summarized as follows: there are at least two sets of elements and at least one relation that define how elements from a first set are related to elements of a second set. The relation may be defined in a data structure that maps elements of the first set to elements of the second set. Such mapping may be brought about with the aid of unique identifiers (within each set) of the elements in each set.

A relational database designer may find it challenging to describe real life events and entities on a very complex tables and relations diagram.

Real life events, however, may be suitably defined and presented with the aid of electronic mind maps (also referred to as "mind maps" herein).

In some embodiments, an electronic mind map is a diagram which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Figure 2:
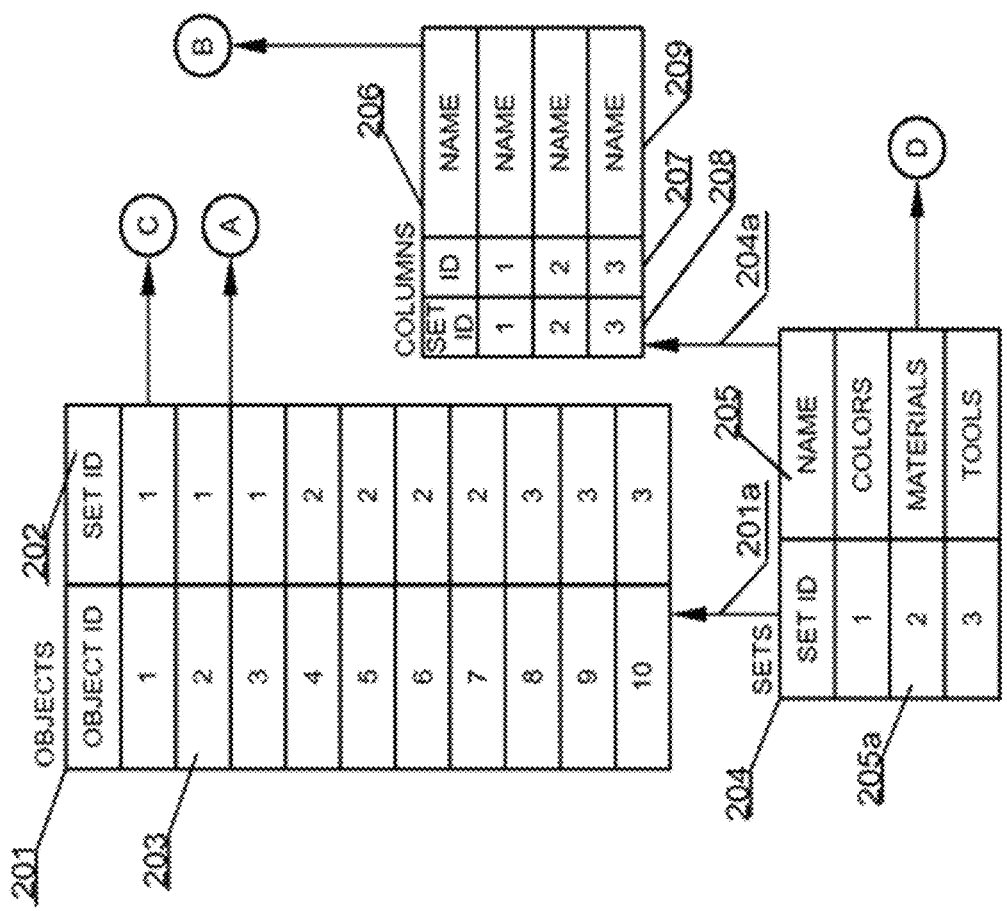
FIG. 2 shows a new database system.
Figure 3:
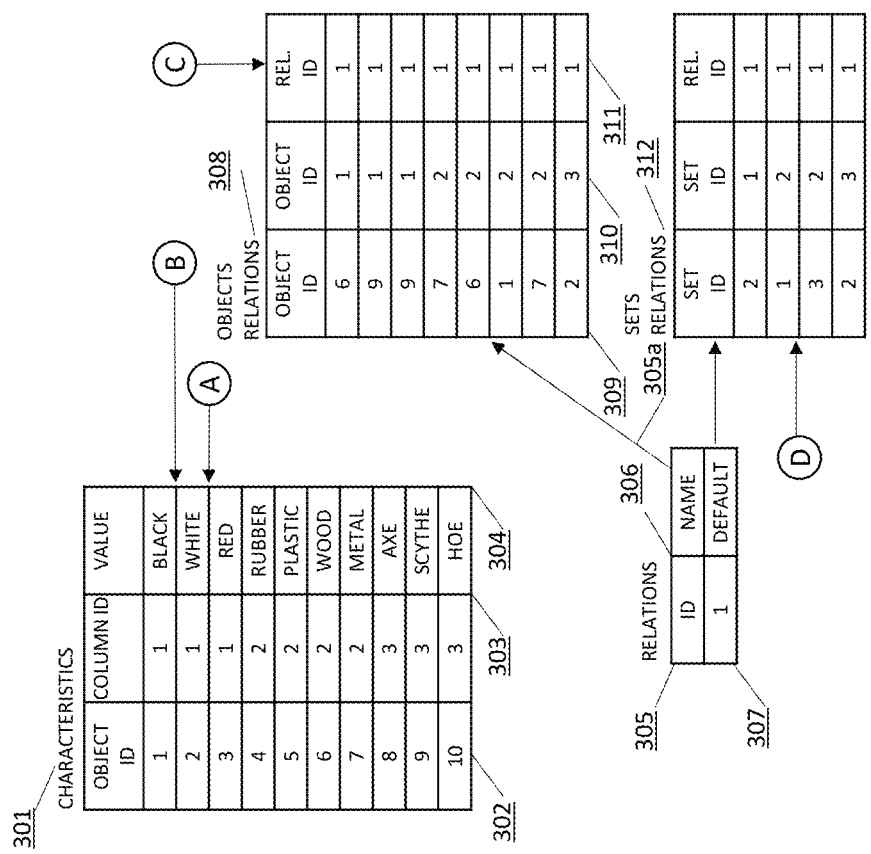
FIG. 3 shows an example of a database system of the present disclosure.

FIG. 2 and FIG. 3 show a new database system. In order to cooperate with mind maps, the database system has been designed differently than known database systems. The database system may comprise six core data structures and optional data structures. The core data structures may comprise SETS 204, OBJECTS 201, COLUMNS 206, CHARACTERISTICS 301, RELATIONS 305 and OBJECTS RELATIONS 308. It should be noted that the names above are exemplary only and the respective core sets are defined rather by their function within the system than their name.

The first data structure is called SETS 204 because it may be used to logically hold data related to sets of data. Sets of data may be represented on a mind map as nodes. Each entry in a SETS data structure 204 may comprise at least a unique identifier 205a of a data set and may also comprise a name 205 of the data set. The SETS data structure may be a top level structure and may not refer to other data structures, but other data structures may refer to the SETS data structure as identified by respective arrows between the data structures of FIG. 2.

Each set of data may be, as in the real world, characterized by one or more properties. The second data structure may be called COLUMNS 206. A property, typically referred to as a "column," may be uniquely identified with an identifier ID 207 and may be associated with a data set, defined in the SETS data structure 204, with the aid of an identifier herein called SET ID 208. A column may also be associated with a name 209. As indicated by an arrow 204a, the COLUMNS data structure may logically, directly reference the SETS data structure 204, because the COLUMNS data structure may utilize the identifiers of data sets. If, for example, each color of the data set called COLORS comprises another property, such as RGB value, an exemplary entry in the COLUMNS data structure may comprise the following values: '1, 4, RGB'. Referring back to an example from FIG. 2, there may be three columns wherein each column is associated with a textual identifier "NAME" 209.

Objects may form elements of respective data sets in the SETS 204 data structure and may have properties defined by the COLUMNS 206 data structure. Objects may be held in the OBJECTS 201 data structure. The OBJECTS 201 data structure may hold entries uniquely identified with an identifier ID 203 and associated with a set, defined in the SETS data structure 204, with the aid of an identifier herein called SET ID 202. As indicated by an arrow 201a, the OBJECTS data structure may logically, directly reference the SETS data structure, as, for example, the SETS data structure utilizes identifiers of sets. Referring back to an example from FIG. 2, there are ten objects in the database, namely three colors, four materials, and three tools. Hence, the OBJECTS data structure 201 may comprise ten objects.

A fourth core data structure, identified as CHARACTERISTICS 301 in FIG. 3, may hold data entries of each property of each object in FIG. 3. This data structure may be a fundamental difference from known databases in which there are rows of data that comprise entries for all columns of a data table. In the present disclosure, each property of an object is stored as a separate entry, which may greatly improve scalability of the system and allow, for example, the addition of object properties in real time.

The CHARACTERISTICS 301 data structure may hold entries uniquely identified using an identifier OBJECT ID 302 and may be associated with a property, defined in the COLUMNS data structure 206, with the aid of an identifier herein referred to as COLUMNID 303. Further, each entry in the CHARACTERISTICS data structure may comprise a value of a given property of the particular object. As indicated by respective arrows originating from sources A and B, the CHARACTERISTICS data structure 301 may logically, directly reference the COLUMNS data structure and the OBJECTS data structure, because CHARACTERISTICS data structure 301 uses the identifiers from the respective data structures. CHARACTERISTICS data structure 301 includes a VALUE property 304, such as: black, white, red, rubber, plastic, wood, metal, axe, scythe, and hoc.

Referring to an example from FIG. 3, there are ten characteristics that may result from the premise that there are three colors, four materials and three tools. By way of a non-limiting example, one can easily recognize that the BLACK color refers to an object having ID of 1 and a property having ID of 1. By using these identifiers, for example, one may determine that the property description is "NAME" and that the object belongs to the set whose description is "COLORS".

A fifth core data structure, RELATIONS 305, may function as an operator to hold data regarding relations present in the database. This may be a simple structure and, in principle, may hold an identifier of a relation ID 307 and additionally hold a textual description of the relation i.e., a NAME 306. As indicated by an arrow 305a, the RELATIONS data structure may logically, directly reference (e.g., downwards direction) an OBJECTS RELATIONS data structure 308, because the OBJECTS RELATIONS may use the identifiers of the relations. While only one entry is illustrated in the RELATIONS data structure, there may be a plurality of types of relations. For example, a type of relation may be indicative of a direction (e.g., unidirectional, bidirectional, etc.) of a relation.

Referring back to mind maps, for example, a relation present in the RELATIONS 305 data structure, may directly map to a branch between two nodes of a mind map. In some embodiments, as in typical mind maps, a relation may be provided with a textual description.

A sixth core data structure may be the OBJECTS RELATIONS data structure 308. This data structure may be designed to provide mapping between a relation from the RELATIONS data structure 305 and two objects from the OBJECTS data structure 201. For example, a first entry in the OBJECTS RELATIONS data structure 308 defines that a relation having identifier of 1 exists between object having an identifier of 1 and an object having an identifier of 6. This may be an exact definition that a material of wood has a color of black, which is defined across the present relational database system. OBJECT RELATIONS data structure 308 includes Object ID columns 309, Object ID column 310, and Relation ID column 311.

In some embodiments, a seventh data structure may exist in a database system. This data structure may hold data regarding relations between respective data sets and in FIG. 3 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student-teacher relation between persons assigned to a particular set. Self-referencing links can be also unidirectional which means that the Entities are bound only in one direction. One can fetch information about linked Entities but cannot refer back to source from the results.

As described, a relational database system of tables may, in one possible example implementation, be stored in the above-described six data structures. In some instances, most of the data may be kept in the OBJECTS and CHARACTERISTICS data structures.

The data structures that are illustrated and described in FIG. 2 and FIG. 3 may also be altered in various ways. For example, in FIG. 2, the OBJECTS data structure can be partitioned or sharded according to SET ID 202. Sharding, as used herein, may generally refer to horizontal partitioning, whereby rows of database tables may be held separately rather than splitting by columns. Each partition may form part of a "shard," wherein each "shard" may be located on a separate database server or physical location. Similarly, in FIG. 3, for example, the CHARACTERISTICS data structure can be partitioned or sharded according to COLUMN ID 303. When sharding is used, for every column in a set, the system may create key value tables that can comprise of the values from the chosen column. The OBJECT RELATIONS table can also be partitioned or sharded according to the REL. ID 311 or sharded according to an algorithm that can maintain persistence. FIGS. 2 and 3 are for illustration purposes only and may comprise of more columns than is illustrated in those figures.

Figure 4:
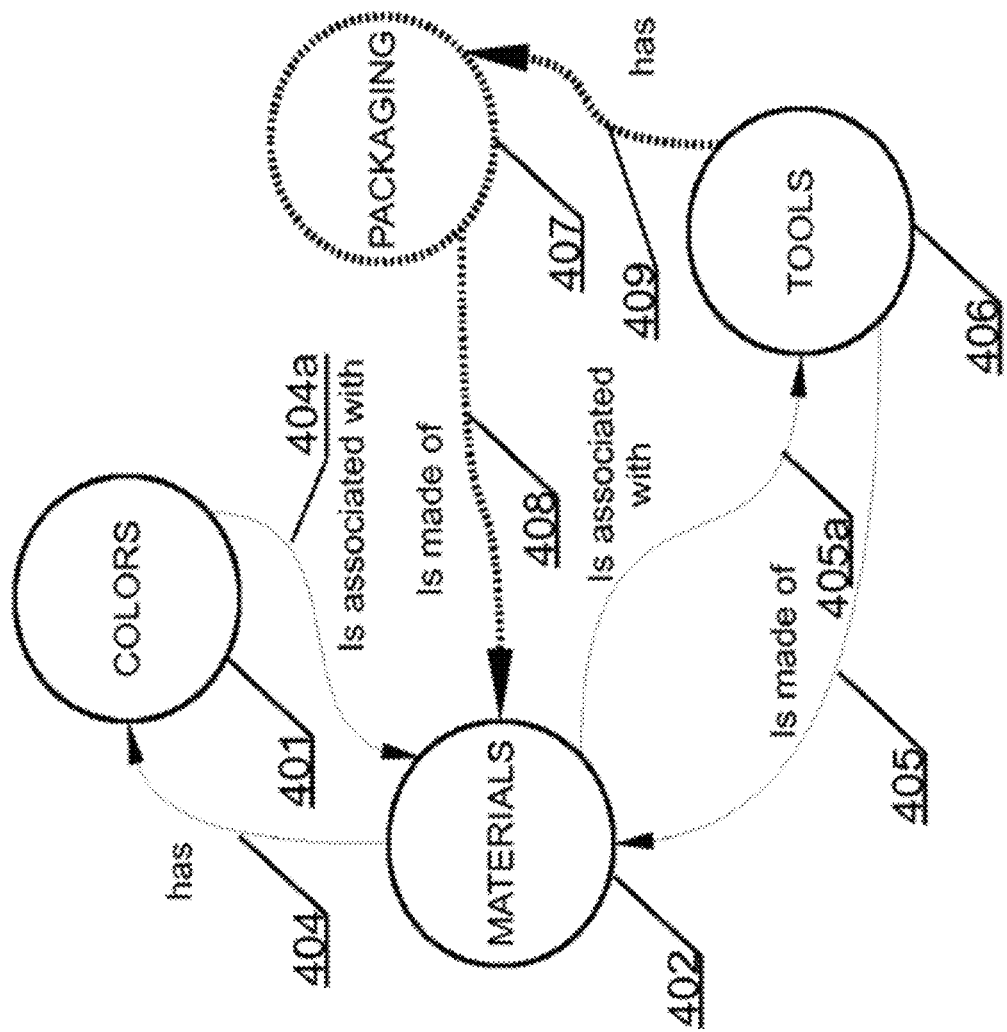
FIG. 4 depicts a mind map that may represent the database of FIG. 2 and FIG. 3.

FIG. 4 depicts a mind map that may represent relationships in the database of FIG. 2. There are three nodes that may represent sets of data, namely COLORS 401, MATERIALS 402 and TOOLS 406. A mind map may additionally define branches between respective nodes. Taking into account the relational database which may be defined according to the new database system in FIGS. 2 and 3, there are four branches. A first branch 404 of the mind map is defined between COLORS 401 and MATERIALS 402 and may imply that a MATERIAL may have a COLOR. A second branch 404a of the mind map may be defined between COLORS 401 and MATERIALS 402 and may imply that a COLOR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405a of the mind map may be defined between MATERIALS 402 and TOOLS 406 and may imply that a MATERIAL may be associated with a TOOL.

The relational database may be further expanded to also encompass a possibility that a TOOL may have 409 a PACKAGING 407 and the PACKAGING is made of a MATERIAL from MATERIALS 408.

In some embodiments, because all identifiers may be generated automatically, during creation of the database system of FIGS. 2-3, one may start from the mind map presented in FIG. 4. For each node, a designer may create a name of a set and properties of the objects that may be kept in the set. Similarly, the designer may create branches as relations between respective nodes, such as data sets. Based on such mind map definitions, the system of FIGS. 2-3 may be automatically generated from the mind map of FIG. 4. In particular embodiments, there may additionally be a process of assigning properties to each node of the mind map, wherein each property is an entry in the second data structure, such as the COLUMNS 206 data structure.

A database structure disclosed herein can be created by a method described as follows. A computer implemented method may store data in a memory and comprise the following blocks, operations, or actions. A first data structure may be created and stored in a memory, wherein the first data structure may comprise a definition of at least one data set, wherein each data set comprises a data set identifier and logically may hold data objects of the same type. Next, a second data structure may be created and stored in the memory, wherein the second data structure may comprise definitions of properties of objects, wherein each property may comprise an identifier of the property and an identifier of a set to which the property is assigned.

Further, a third data structure may be created and stored in the memory, wherein the third data structure may comprise definitions of objects, and wherein each object comprises an identifier and an identifier of a set the object is assigned to. A fourth data structure may be created and stored in the memory, wherein the fourth data structure may comprise definitions of properties of each object, and wherein each property of an object associates a value with an object and a property of the set to which the object is assigned. A fifth data structure may be created and stored in the memory, wherein the fifth data structure may comprise definitions of relations, and wherein each relation comprises an identifier of the relation. Finally, a sixth data structure may be created and stored in the memory, wherein the sixth data structure may comprise definitions of relations between objects wherein each objects relation associates a relation from the fifth data structure to two objects from the third data structure.

In accordance with the database system of the present disclosure (e.g., FIGS. 2-3), a process of adding an object (a record) to the database may be outlined as follows. First a new entry may be created in the OBJECTS data structure 201. The object may be assigned to a given data set defined by the SETS data structure 204. For each object property of the given set defined in the COLUMNS data structure 206, there may be created an entry in the CHARACTERISTICS data structure 301. Subsequently there may be created relations of the new object with existing objects with the aid of the OBJECTS RELATIONS data structure 308.

A method of removing objects from the database system is described below. First, an object to be removed may be identified and its corresponding unique identifier may be fetched. Next, any existing relations of the object to be removed with other existing objects may be removed by deleting entries in the OBJECTS RELATIONS data structure 308 that are related to the object being removed. Subsequently, the object entry may be removed from the OBJECTS data structure 201. The object may be removed from a given data set defined by the SETS data structure 204. Because the properties of each object are stored separately, for each object property of the given set defined in the COLUMNS data structure 206, there is removed an entry in the CHARACTERISTICS data structure 301 related to the object identifier being removed from the database., A method for creating the database system using a mind map is provided. The first step may be to create a mind map structure. Defining a database system using a mind map may be beneficial and allow a designer to more easily see the big picture in very complex database arrangements. A designer may further be able to visualize the organization of data sets and relations that may exist between the respective data sets. Next, a new node may be added to the mind map structure. This may typically be executed via a graphical user interface provided to a database designer. A node of a mind map may represent a set as defined with reference to FIG. 2. Therefore, it may be advantageous at this point to define, preferably using the graphical user interface, properties associated with the data set associated with this particular node of the mind map. Then, a record or entry may be stored in the first and second data structures, which are the SETS data structure 204 and COLUMNS data structure 206 of FIG. 2, respectively.

The next step may be to create a branch within the mind map. A branch may start at a node of the mind map and end at the same node of the mind map to define a self-relation. For example, there may be a set of users for which there exists a hierarchy among users. Alternatively or in addition to, a branch may start at a node of the mind map and end at a different node, for example, of the mind map to define a relation between different nodes, i.e., different sets of objects of the same kind.

The following operations may be executed to store a record in the fifth data structure, which is the RELATIONS data structure 305 of FIG. 3. At least one object can be added to existing data sets, i.e., nodes of the mind map. In some embodiments, a way of adding objects to mind map nodes may be by way of a graphical user interface with one or more graphical elements representing nodes and connections among the nodes. For example, by choosing an option to add an object, a user may be presented with a set of properties that may be set for the new object. The properties may be defined in the COLUMNS data structure 206 of FIG. 2. After the user provides an input, an object may be added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 2 and 3, respectively.

Databases of the present disclosure may store data objects in a non-hierarchical manner. In some cases, such databases may enable database queries to be performed without the need of joins, such as inner or outer joins, which may be resource intensive. This may advantageously improve database queries.

Figure 5:
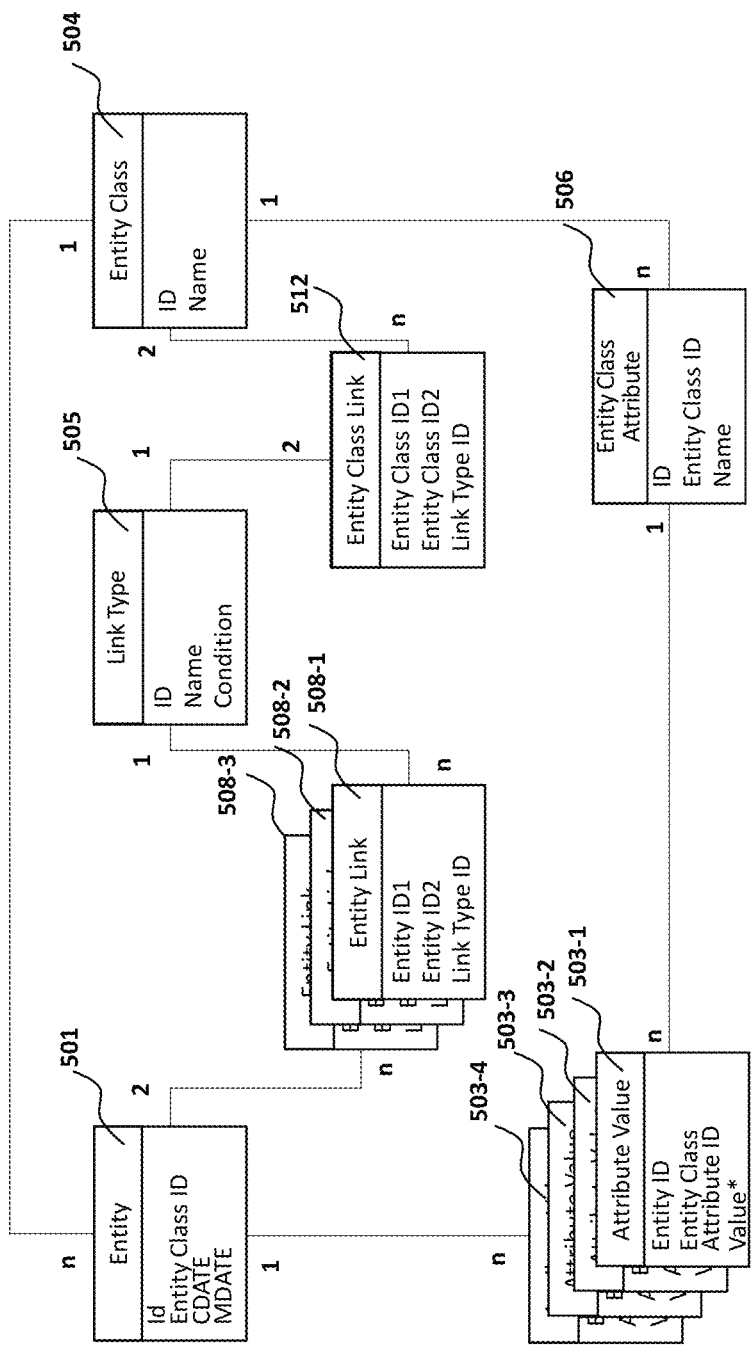
FIG. 5 shows an exemplary model of a database system of the present disclosure.

FIG. 5 shows an exemplary model of a database system of the present disclosure. The model may be similar to, or correspond to, the examples of the database systems described in FIG. 2 and FIG. 3. The model may comprise a set of predefined data structures. In the illustrated model, the Entity data structure 501 may correspond to the OBJECTS data structure 201 as described in FIG. 2. Similarly, the Entity data structure may hold entries uniquely identified with an identifier ID (e.g., ID) and associated with an entity class, defined in the Entity Class data structure 504, with the aid of an identifier herein called Entity Class ID. The Entity data structure 501, in some embodiments, may further comprise a timestamp corresponding to the date and time an object is created (e.g., CDATE) and/or date and time an object is last modified (e.g., MDATE).

The Entity Class data structure can correspond to the SETS data structure 204 as described in FIG. 2. Similarly, the Entity Class data structure may hold data related to Entity Class data. Classes of data may be represented on a mind map as nodes. Each entry in an Entity Class data structure 504 may comprise at least a unique identifier (e.g., ID) and may also comprise its name (e.g., Name). For each entity property of the given entity class defined in the Entity Class Attribute data structure 506, there may be created an entry in the Attribute Value data structure 503-1, 503-2, 503-3, 503-4. Subsequently there may be created relations of the new object with existing objects with the aid of the Entity Link data structure 508-1, 508-2, 508-3.

The Entity Class Attribute data structure 506 can correspond to the COLUMNS data structure 206 as described in FIG. 2. Similarly, the Entity class Attribute data structure 506 may hold entries uniquely identified with an identifier ID (e.g., ID) that is associated with an entity class, defined in the Entity Class data structure 504, with the aid of the Entity Class ID, and the name of the attribute (e.g., Name). The Attribute Value data structure 503-1, 503-2, 503-3, 503-4 may correspond to the CHARACTERISTICS data structure 301 as described in FIG. 3, except that the Attribute Value data structure may use multiple tables 503-1, 503-2, 503-3, 503-4 to hold entries uniquely identified using an identifier (e.g., Entity ID), a property defined in the Entity class Attribute data structure 506, with the aid of an identifier (Entity Class Attribute ID) and a value of a given property of the particular entity (e.g., Value). In some cases, the multiple tables may collectively hold the attribute values with each table storing a portion of the data.

The Entity Link data structure 508-1, 508-2, 508-3 can correspond to the OBJECTS RELATIONS data structure 308 as described in FIG. 3 with the exception that multiple tables 508-1, 508-2, 508-3 may be used to collectively hold data related to relations or connections between two entities. Similarly, an entry of the Entity Link data structure may comprise two entity IDs (e.g., Entity ID1, Entity ID2) and the identifier of the Link Type (e.g., Link Type ID) between the two entities. The Link Type identifier may reference from the Link Type data structure 505.

The Link Type data structure 505 can correspond to the RELATIONS data structure 305 as described in FIG. 3. Similarly, the Link Type data structure 505 may hold an identifier of a link type ID (e.g., ID) and additionally hold a textual description of the link (e.g., NAME). In some cases, the link type can define a permission level of accessing the connection between entities or entity classes. For example, the link type may be a private type link that only the user who creates the link or the system administer can view or modify, or a public type link that can be viewed or defined by any user. For instance, an administrator or certain users with privileges may configure a link to be visible to other users. In this case, the administrator may decide to "publish" the link, which may enable the link to be available to the public, thereby converting the link type from private to public. Alternatively or in addition to, a link type may have various other permission levels or editable privileges that are provided by the system.

A type or level of data defined by a permission definition may be any one or more of the data units described with respect to FIGS. 2-5, such as sets of data identified in SETS 204, data properties, types, or columns identified in COLUMNS 206, data objects identified in OBJECTS 201, data entries defined in CHARACTERISTICS 301, data relations identified in RELATIONS 305, data object relations identified in OBJECT RELATIONS 308, and/or data set relations identified in SETS RELATIONS 312. A user action, as referred to herein, may access, add to, remove from, or otherwise modify any data structures or elements thereof described elsewhere herein.

Examples of Visualized Databases

Methods of the present disclosure may include the use of data objects. A data object stored in a data structure may be linked with another data object in the same data structure or in another data structure. However, the two data objects may be related to a single abstract class. For example, an enterprise may have multiple clients, and each client may have an identifier, a purchased product, and billing information. In a database, a client identifier and a purchased product may be placed together in a structure of a sale, but a client identifier and billing information may be organized into a structure of finance. However, an abstract class representing a client may aggregate an identifier, a purchased product, and billing information. In some embodiments, a database can be visualized as a graph with each entity class depicted as a node and connections between classes depicted as links. An interactive breadcrumb associated with an analysis or search path may be presented to a user on a user interface (UI) along with the graph. Beneficially, a visualized graph may allow a user to see a bigger picture of aggregated data objects in terms of abstract classes without going into the details of data objects. In some embodiments, a user interface may be provided to allow users to assign weights to multiple analyses and then combine the analyses into an integrated analysis.

The user interfaces may be displayed, for example, via a web browser (e.g., as a web page), a mobile application, and/or a standalone application. In some embodiments, the user interfaces shown may also be displayed on any suitable computer device, such as a cell/smart phone, tablet, wearable computing device, portable/mobile computing device, desktop, laptop, or personal computer, and are not limited to the examples as described herein. In some cases, multiple user interfaces may be switchable. A user may switch between different user interfaces than illustrated here. The user interfaces and functionality described herein may be provided by software executing on the individual's computing device, by a data analysis system located remotely that is in communication with the computing device via one or more networks, and/or some combination of software executing on the computing device and the data analysis system. The user interfaces may be provided by a cloud computing system. In some embodiments, analogous interfaces may be presented using audio or other forms of communication. In some embodiments, the interfaces may be configured to be interactive and respond to various user interactions. Such user interactions may include clicking or dragging with a mouse, manipulating a joystick, typing with a keyboard, touches and/or gestures on a touch screen, voice commands, physical gestures made in contact or within proximity of a user interface, and the like.

Methods and systems of the present disclosure may be combined with other methods and systems, such as those described in U.S. patent application Ser. No. 14/222,795, filed Mar. 24, 2014, U.S. patent application Ser. No. 14/315, 481, filed Jun. 26, 2014, U.S. patent application Ser. No. 14/469,958, filed Aug. 27, 2014, and U.S. patent application Ser. No. 14/469,968, filed Aug. 27, 2014, each of which is entirely incorporated herein by reference. Such methods and systems, for example, may be used with methods and systems of the present disclosure to store data as a mind map in a relational database system.

Computer Systems

The present disclosure provides computer systems that are programmed to implement methods of the disclosure. FIG. 9 shows a computer system 901 that is programmed or otherwise configured to create permission schemas and otherwise determine user access rights during a user action. The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user (e.g., a webserver, a database server). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, visualization. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 905.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for applying access rights to a database comprising:
   one or more computer processors operatively coupled to the database, wherein the one or more computer processors are individually or collectively programmed to:
   (a) create a plurality of permission schemas and storing the plurality of permission schemas in a plurality of permission schemas data structures, wherein the plurality of permission schemas data structures define one or more access permissions to data objects stored in the database without including user information;
   (b) store an assignment of one or more of the plurality of permission schemas to a user in a data structure, wherein the data structure comprises a unique user identifier and one or more unique identifiers of the one or more of the plurality of permission schemas; and
   (c) calculate an access right associated with the user for performing an operation directed to at least a subset of data objects stored in the database, wherein the access right is calculated by retrieving the one or more of the plurality of permission schemas assigned to the user via the plurality of permission schemas data structures in (a) and the data structure in (b).

2. The system of claim 1, wherein the access right is calculated further based on a permission status.

3. The system of claim 2, wherein the permission status is stored in another data structure and wherein the permission status indicates a validity of a current permission associated with the user.

4. The system of claim 2, wherein the access right is recalculated when the permission status is invalid.

5. The system of claim 1, wherein at least one of the plurality of permission schemas data structures comprises a name of a permission schema, a unique identifier of the permission schema and a definition of an access permission.

6. The system of claim 1, wherein the access right comprises a mode of access.

7. The system of claim 6, wherein the mode of access is a read access, read/write access, modify access, or execute access.

8. The system of claim 1, wherein the database stores the data objects in a set of predetermined data structures.

9. The system of claim 8, wherein at least one of the plurality of permission schemas defines an access permission for at least one of the set of predetermined data structures.

10. The system of claim 9, wherein the access permission comprises a predicate and an access mode associated with the least one of the set of predetermined data structures.

11. A computer-implemented for applying access rights to a database comprising:
   (a) creating a plurality of permission schemas and storing the plurality of permission schemas in a plurality of permission schemas data structures, wherein the plurality of permission schemas data structures define one or more access permissions to data objects stored in the database without including user information;
   (b) storing an assignment of one or more of the plurality of permission schemas to a user in a data structure, wherein the data structure comprises a unique user identifier and one or more unique identifiers of the one or more of the plurality of permission schemas; and
   (c) calculating an access right associated with the user for performing an operation directed to at least a subset of data objects stored in the database, wherein the access right is calculated by retrieving the one or more of the plurality of permission schemas assigned to the user via the plurality of permission schemas data structures in (a) and the data structure in (b).

12. The computer-implemented method of claim 11, wherein the access right is calculated further based on a permission status.

13. The computer-implemented method of claim 12, wherein the permission status is stored in another data structure and wherein the permission status indicates a validity of a current permission associated with the user.

14. The computer-implemented method of claim 12, wherein the access right is recalculated when the permission status is invalid.

15. The computer-implemented method of claim 11, wherein at least one of the plurality of permission schemas data structures comprises a name of a permission schema, a unique identifier of the permission schema and a definition of an access permission.

16. The computer-implemented method of claim 11, wherein the access right comprises a mode of access.

17. The computer-implemented method of claim 16, wherein the mode of access is a read access, read/write access, modify access, or execute access.

18. The computer-implemented method of claim 11, wherein the database stores the data objects in a set of predetermined data structures.

19. The computer-implemented method of claim 18, wherein at least one of the plurality of permission schemas defines an access permission for at least one of the set of predetermined data structures.

20. The computer-implemented method of claim 19, wherein the access permission comprises a predicate and an access mode associated with the least one of the set of predetermined data structures.

* * * * *